United States Patent
Becker et al.

(10) Patent No.: US 7,322,257 B2
(45) Date of Patent: Jan. 29, 2008

(54) STEP DOWN GEAR TRAIN FOR AN ADJUSTING DEVICE OF AN AUTOMOTIVE VEHICLE SEAT

(75) Inventors: Burckhard Becker, Solingen (DE); Wilfried Beneker, Leichlingen (DE); Van-Toan Ho, Solingen (DE)

(73) Assignee: C. Rob Hammerstein GmbH & Co. KG (DE)

( * ) Notice: Subject to any disclaimer, the term of this patent is extended or adjusted under 35 U.S.C. 154(b) by 736 days.

(21) Appl. No.: 10/835,488

(22) Filed: Apr. 29, 2004

(65) Prior Publication Data

US 2004/0221670 A1  Nov. 11, 2004

(30) Foreign Application Priority Data

May 6, 2003  (DE) ................ 103 20 328

(51) Int. Cl.
*F16H 55/18* (2006.01)
(52) U.S. Cl. ..................................... 74/409
(58) Field of Classification Search ............. 74/425, 74/410, 89.14, 409, 416, 421 R, 421 A, 411.5; 297/362, 362.11
See application file for complete search history.

(56) References Cited

U.S. PATENT DOCUMENTS

| | | | | |
|---|---|---|---|---|
| 2,320,379 A | * | 6/1943 | Niekamp | 74/421 A |
| 2,513,217 A | * | 6/1950 | Tomlines | 74/409 |
| 3,403,570 A | * | 10/1968 | Larson et al. | 74/411.5 |
| 3,687,249 A | * | 8/1972 | Priest et al. | 192/215 |
| 4,192,410 A | * | 3/1980 | Poirier | 192/218 |
| 4,241,619 A | * | 12/1980 | Cerny et al. | 74/440 |
| 4,953,417 A | * | 9/1990 | Baumgarten et al. | 74/409 |
| 5,419,219 A | * | 5/1995 | Takizawa | 74/665 GA |
| 5,588,328 A | * | 12/1996 | Nihei et al. | 74/409 |
| 5,671,636 A | * | 9/1997 | Gagne et al. | 74/409 |
| 6,579,203 B2 | * | 6/2003 | Wang et al. | 475/162 |
| 6,692,397 B2 | * | 2/2004 | Wang et al. | 475/162 |

* cited by examiner

*Primary Examiner*—Vicky A. Johnson
(74) *Attorney, Agent, or Firm*—Akerman Senterfitt

(57) ABSTRACT

A step down gear train for an adjusting device of an automotive vehicle seat which has an input shaft and an output shaft that is connected to a pinion. At least one first cogwheel and one second cogwheel are provided in the path between input shaft and output shaft. A follower wheel is provided, in engagement with the first cogwheel, and is not located in the path between the input shaft and the output shaft. A pusher wheel is provided, that is likewise not located in the path between input shaft and output shaft, and is in engagement with both the follower wheel and the second cogwheel, and is carried so as to be longitudinally slidable. An elastic means is provided, that is associated with the pusher wheel, and which elastically biases said pusher wheel into engagement with the follower wheel and the second cogwheel.

10 Claims, 2 Drawing Sheets

STEP DOWN GEAR TRAIN FOR AN ADJUSTING DEVICE OF AN AUTOMOTIVE VEHICLE SEAT

FIELD OF THE INVENTION

Figure 1:
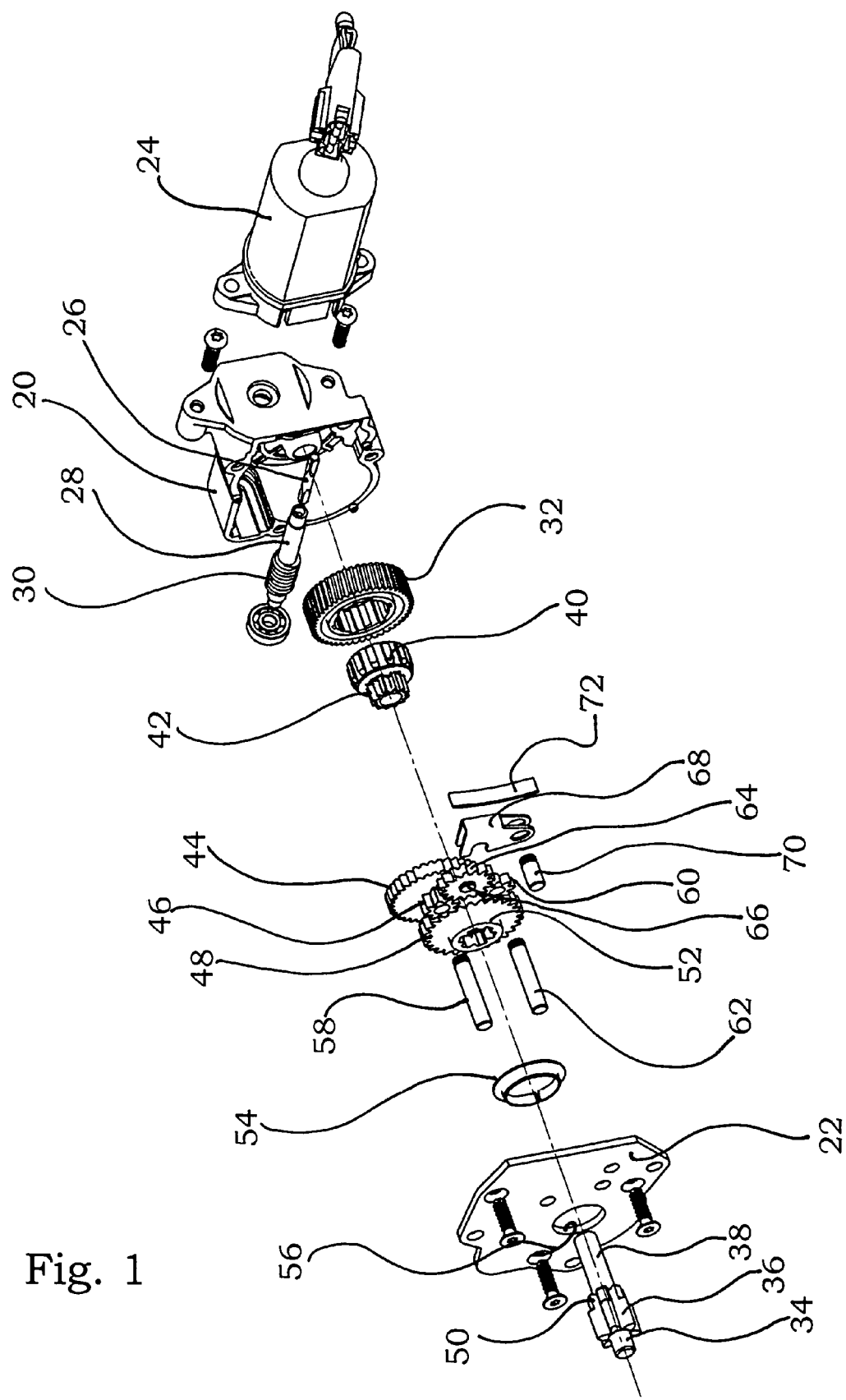

The invention relates to a step down gear train for an adjusting device of an automotive vehicle seat, said step down gear train having an input shaft and an output shaft, a pinion being connected to said output shaft and at least one first and one second cogwheel being located in the path between input shaft and output shaft.

BACKGROUND OF THE INVENTION

Step down gear trains are more specifically utilized for automotive vehicle seats provided with motor-driven adjusting device, for example for the height adjusting device of the seat, the inclination adjusting device of the seat back, the lengthwise or inclination adjusting device of the seat's front edge. Such type adjusting devices require a relatively slow rotating drive, electric motors however rotate at a relatively high speed. Accordingly, the step down gear train must have a sufficiently high gear reduction ratio. In principle, the step down gear train of the type mentioned herein above is also suited for hand driven adjusting devices.

The pinion on the output shaft of the step down gear train usually interengages with a toothed surface area such as a sector gear or a toothed rack. In order for the adjusting device to be clearance free, it must be made certain that, when the drive is idle, the pinion has a fixed position, that is with zero clearance in the one or in the other direction of rotation. Adjusting devices of automotive vehicle seats are also loaded in the load return path. It is to be made certain that the pinion is clearance free not only when it is not loaded but in the loaded condition as well. It is thus made certain that the adjusting device itself is also locked in a defined way and can be maintained in the adjusted position with zero clearance.

Typically, step down gear trains are more loaded in one direction of rotation in the load return path than in the other direction of rotation. A seat height adjusting device is for example loaded by the weight of an occupant in the load return path in the direction which corresponds to lowering the seat, but is normally not loaded in the opposite direction. Crash loads however often act in the opposite direction, and in most cases only in one direction of rotation.

Known step down gear trains usually have a considerable clearance at the pinion. This clearance often is too great for such a step down gear train being utilized in adjusting devices of automotive vehicles and cannot be tolerated. In the case of inclination adjusting devices for the seat back of an automotive vehicle seat, the seat back constitutes a quite long lever arm that is pivotal about the axis of the adjusting device. In the upper region of the seat back no clearance is allowed to be noticed, meaning the seat back is not allowed to be loose.

BRIEF SUMMARY OF THE INVENTION

Accordingly, it is an object of the invention to develop a step down gear train of the type mentioned herein above in such a manner that the pinion is clearance free at normal loads and preferably also blocks more reliably upon experiencing a crash load.

In view of the step down gear train of the type mentioned herein above, the solution to this object is to provide a follower wheel that engages the first cogwheel and that is not located in the path between input shaft and output shaft, to provide a pusher wheel that is not located in the path between input shaft and output shaft either and that engages both the follower wheel and the second cogwheel, the pusher wheel having no stationary bearing but being mounted so as to be slidable in the longitudinal direction and to provide an elastic means that is associated with the pusher wheel and elastically biases said pusher wheel in such a manner that it pushes the second cogwheel and the follower wheel to engage the first cogwheel.

This pressure occurs when the automotive vehicle seat experiences normal loads. As used herein, a normal load refers to torques as they occur under normal operating conditions of the automotive vehicle, acting thereby onto the pinion. A crash torque can be significantly higher. In accident situations, compensating for a clearance is no longer a primary concern; what is needed in these cases is that the pinion be sufficiently solidly engaged so that the pinion remains engaged with the toothed part cooperating with the pinion when experiencing a crash load so that the adjusting device will not be allowed to come free even upon experiencing a crash load.

The invention provides for two additional cogwheels, namely a follower wheel and a pusher wheel. The follower wheel is preferably built according to the same principle as the second cogwheel. The pusher wheel engages the follower wheel and the second cogwheel. The elastic means pushes it to engage the follower wheel and the second cogwheel so that these fit against tooth flanks of the first cogwheel in such a manner that the first cogwheel is clearance free. If, as this is provided for in a preferred development, the first cogwheel is directly connected to the pinion, the pinion is also clearance free.

The force of the elastic means is sized so that, under normal operating conditions, the pusher wheel fits against both the second cogwheel and the follower wheel and pushes these wheels to engage the first cogwheel with a zero clearance fit. When the step down gear train experiences a crash load, it is no longer important to have a clearance free fit. Upon experiencing a crash load, the step down gear ratio provides additional securement. The pusher wheel then additionally locks the second cogwheel. As a result, the latter is locked or rather retained at two teeth so that it is provided with a better locked fit than with a step down gear train having no pusher wheel. The elastic means is preferably configured to be a spring, more specifically a leaf spring.

The pusher wheel applies a torque onto both the second cogwheel and the follower wheel. The second cogwheel is thereby biased into another direction of rotation than the follower wheel. As a result, the teeth of the second cogwheel will fit against flanks of the first cogwheel that are free to rotate in a first direction of rotation whereas the meshing teeth of the follower wheel fit against teeth that are free in the other direction of rotation. The first cogwheel is thus secured. Preferably, at least one tooth of the follower wheel or of the second cogwheel, which meshes with the first cogwheel, is inclined at so steep an angle relative to a flank of the first cogwheel that the best possible locked fit is achieved in the load return path in the two directions of rotation.

Preferably, the pusher wheel has a smaller size than the first cogwheel but a larger size than the follower wheel and the second cogwheel. The pusher wheel has an axis that is not fixed onto the frame, which makes it different from all of the other cogwheels that have an axis fixed to the frame.

The pusher wheel is capable of moving in a direction that is substantially oriented such that the pusher wheel is allowed to move toward, and away from, the axis of the first cogwheel. The pusher wheel is preferably carried in a longitudinal guide member so as to allow slidable longitudinal movement thereof, with the longitudinal guide member being oriented substantially on a line joining the axis of the pusher wheel with the axis of the first cogwheel.

Upon experiencing a crash load, the pusher wheel will, depending on the direction of rotation of the crash load in the load return path, be either pulled toward the first cogwheel or pushed away therefrom. If it is pulled toward the cogwheel, engagement will be further improved so that as a whole a better locked fit will be achieved in the load return path. This is made use of in practice using the step down gear train. The step down gear train is disposed in such a manner that a crash load will cause the pusher wheel to be pulled into the gap between the second cogwheel and the follower wheel. By way of example, it will be assumed that the step down gear train is associated with a height adjustment device. In the event of a frontal crash, the seat will be lifted, the seat pan being accordingly loaded in a direction opposite to a normal condition in which the weight of the occupant pushes the seat pan downward. The step down gear train is mounted in such a manner that, when the seat is pulled upward, the pinion rotates in such a manner that the pusher wheel is pulled toward the first cogwheel.

In a preferred development, the invention proposes to connect the input shaft to a worm and to provide a worm wheel that meshes with the worm. Then, the step down gear has two different stages, namely a first stage with worm and worm wheel and next at least two intermeshing cogwheels, preferably three cogwheels. A high gear reduction ratio is thus achieved which may additionally be adapted to the respective purpose of utilization using simple means. By selecting the cogwheels, the gear reduction ration may be adapted to the respective requirement such as slow or fast motor drive or hand drive for example.

Finally, it has been found advantageous to have the pusher wheel disposed on an arm that is pivotally hinged to a frame of the step down gear train and to have it biased toward the first cogwheel by means of the elastic means. This allows for easy implementation of the longitudinally slidable bearing of the pusher wheel.

DETAILED DESCRIPTION OF THE DRAWINGS

Figure 2:
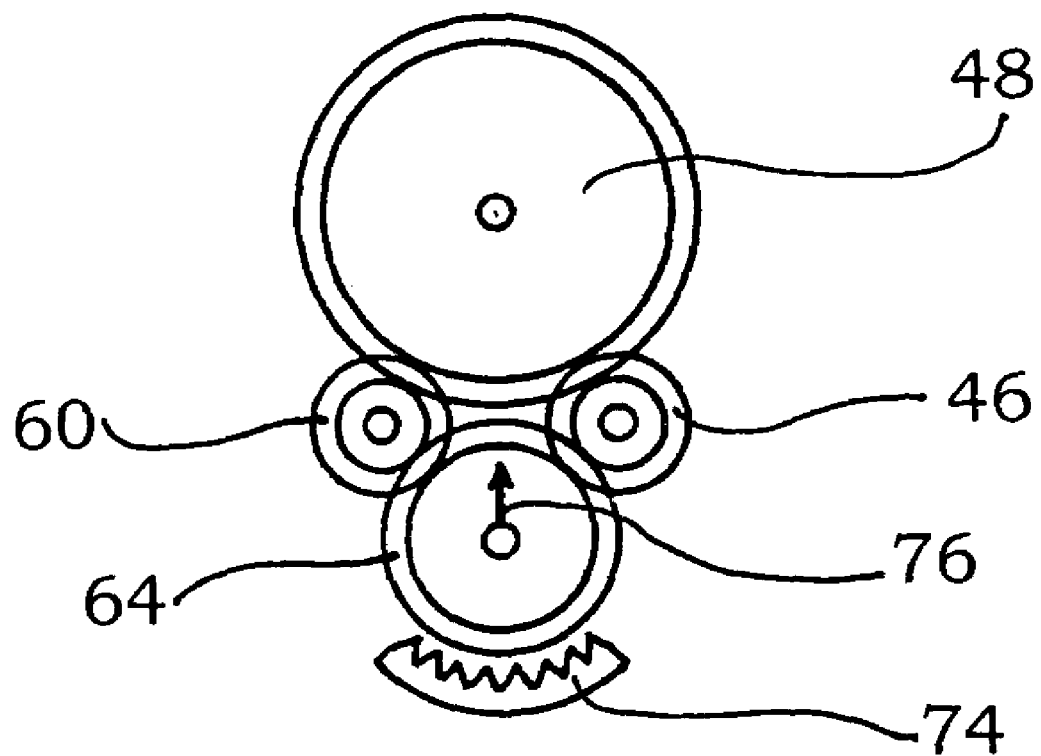

Further advantages and characteristics of the invention will become apparent from the other claims and from the following detailed non restrictive description of an embodiment thereof, given by way of example only with reference to the drawing in which:

FIG. 1 is a perspective view in the form of an assembly drawing of a step down gear train in accordance with the invention and FIG. 2 is a schematic illustration of a first cogwheel, of a second cogwheel, of a pusher wheel and of a follower wheel with additional securing members.

DETAILED DESCRIPTION OF THE INVENTION

There is provided a follower wheel 60 that is built according to the same principle as the second cogwheel 46. It is rotatably carried about a second pin 62 in a fashion similar to that of the second cogwheel 46, the pins 58, 62 are built according to the same principle. The follower wheel 60 is angularly offset relative to the second cogwheel 46, the angle the apex of which lies on the axis of the output shaft 34 ranging from 5 to 90 degrees, preferably from 20 to 40 degrees.

The step down gear train has a housing substantially comprising two housing parts, a shell 20 and a plate 22. An electric motor 24 is flanged to the shell 20. Via a flexible shaft 26, it drives an input shaft 28 that is connected to a worm 30 and is carried in a ball bearing. The worm 30 meshes with a worm wheel 32 that rotates about the axis of an output shaft 34 having a pinion 36 and that is rotatably carried on a pinion shaft 38. The worm wheel 32 is recessed for fittingly receiving an insert 40 which is connected to a primary cogwheel or toothed wheel 42. Alternatively, the worm wheel 32 may also be solidly connected to the primary cogwheel 42. The solution shown in FIG. 1 permits to replace the primary cogwheel shown by another primary cogwheel having a greater or lesser number of teeth. Further, the worm wheel 32 and the primary cogwheel 42 may be made from different materials. The insert 40 is connected to the primary cogwheel 42 and has a bearing hole for the pinion shaft 38 so that it also carries the worm wheel 32.

The primary cogwheel 42 meshes with a secondary cogwheel or toothed wheel 44 that is solidly connected to a tertiary cogwheel 46 having clearly less teeth. The latter in turn meshes with a quaternary cogwheel which itself rotates about the axis of the output shaft 34 and is detachably connected with the pinion 36. For this purpose, it has a recess adapted to be connected, in the form of a plug connection, to a driver region 50 that is immediately adjacent the pinion 36. The recess projects axially and forms a bearing surface 52. A slotted bearing ring 54, which in turn is received in a bearing hole 56 of the housing's plate 22, is fixed thereon. In the assembled condition, the pinion 36 protrudes from said bearing hole 56.

Advantageously, several stages are accordingly carried on the pinion shaft 38, this applying to the worm wheel 32, the primary cogwheel 42 and the quaternary cogwheel 48. The unit consisting of the secondary cogwheel 44 and of the tertiary cogwheel 46 is carried on a first pin 58 that is retained at one end in the plate 22 and at its other end in the shell 20.

The wheels described hereto before are all located in the path between input shaft 28 and output shaft 34. Without modifying the housing, the gear train can be manufactured with different gear reduction ratios by choosing for example a quaternary cogwheel 48 of a larger or smaller size and by forming the tertiary cogwheel 46 accordingly. Other modifications are possible. Alternative implementations of the primary cogwheel 42 have already been mentioned herein above.

In the description given herein above, the toothed wheels or cogwheels 42 to 48 that follow the first stage consisting of worm 30 and worm wheel 32 have been labeled with Latin numbers and drawn in accordance with their sequential order in the path between input shaft 28 and output shaft 34. For better understanding of the following description, the quaternary cogwheel 48 will be referred to herein after as the first cogwheel 48, the tertiary cogwheel 46 as the second cogwheel.

There is provided a follower wheel 60 that is built according to the same principle as the second cogwheel 46. It is rotatably carried about a second pin 62 in a fashion similar to that of the second cogwheel 26, the pins 58, 62 are built according to the same principle. The follower wheel 60 is angularly offset relative to the second cogwheel 46, the angle the apex of which lies on the axis of the output shaft 34 ranging from 5 to 90 degrees, preferably from 20 to 40 degrees.

There is eventually provided a pusher wheel 64. It meshes both with the second cogwheel 46 and with the follower wheel 60. In contrast to all of the other wheels described hereto before, the axis of this one is not stationarily carried, but held so as to be movable. For this purpose, there is provided an arm 68, that is carried in the housing 20, 22 so as to be pivotal about a third pin 70. The arm 68 is a part made of bent sheet metal that has a U-profile when viewed from the top. It has two holes for receiving the third pin 70. At a distance from these holes, long holes, which are open on one side, are implemented, said long holes surrounding the axis 66 of the pusher wheel 64 and holding it thereby.

In the housing, a leaf spring 72 is secured in a slot (not shown) at one end, its other resilient free end fitting against the arm 68, thus also elastically biasing the pusher wheel 64 against the first cogwheel 48. This is how the already described pressure is exerted onto the second cogwheel 46 and onto the follower wheel 60 so that these two wheels are pressed against the first cogwheel 46. As described above, a torque is thereby also applied to the two wheels 46, 60.

FIG. 2 shows a securing member 74. It is located outside of the pusher wheel 64 and has a toothed surface substantially corresponding to the toothed surface of the pusher wheel 64. Under normal vehicle operating conditions, the securing member has no function. It only performs a function when the pusher wheel 64 is pushed away from the first cogwheel 48 due to a crash torque being applied to the load return path, meaning when it is located at a greater distance from said point of engagement. Then, the teeth of the pusher wheel 64 will engage the surface feature 74 of the securing member, thus blocking the pusher wheel 64 from being further pushed out. This occurs when the pusher wheel 64 still engages the teeth 46, 60 which in turn still mesh with the first cogwheel 48 so that blocking occurs. This blocking will not occur under normal conditions when the force of the spring 72 cannot be overcome, meaning when the pusher wheel 64 is not allowed to move so far away from the first cogwheel 48 that it is capable of engaging the securing device 74.

What is claimed is:

1. A step down gear train for an adjusting device of an automotive vehicle seat, comprising:
   an input shaft and an output shaft;
   a pinion connected to said output shaft; and
   at least one first cogwheel and one second cogwheel located in the path between input shaft and output shaft,
   wherein the step down gear further comprises a follower wheel that engages the first cogwheel and that is not located in the path between input shaft and output shaft, and a pusher wheel that is not located in the path between input shaft and output shaft and that engages both the follower wheel and the second cogwheel,
   wherein the pusher wheel is mounted so as to be slidable in a longitudinal direction and an elastic means is provided and is associated with the pusher wheel and elastically biases said pusher wheel into engagement with the follower wheel and the second cogwheel.

2. The step down gear train in accordance with claim 1, wherein the pusher wheel comprises an axis, and wherein an arm is provided, the arm having a first side receiving the axis of the pusher wheel, and a second side pivotally hinged to a housing of the step down gear train, wherein an elastic means is provided and acts onto the arm.

3. The step down gear train in accordance with claim 1, wherein the second cogwheel and the follower wheel are arranged in mirror-symmetry, the minor symmetry has a mirror plane defined by an axes of the first cogwheel and the axis of the pusher wheel.

4. The step down gear train in accordance with claim 1, wherein the second cogwheel and the follower wheel are substantially identical.

5. The step down gear train in accordance with claim 1, wherein the second cogwheel and the follower wheel have the same number of teeth and the same diameter.

6. The step down gear train in accordance with claim 1, wherein the elastic means is designed so that if a torque is applied to the output shaft in the rearward direction, no clearance is provided at the pinion.

7. The step down gear train in accordance with claim 1, wherein a worm is provided, the input shaft is connected to the worm, and a worm wheel is provided that meshes with the worm.

8. The step down gear train in accordance with claim 7, wherein a primary toothed wheel is provided, the worm wheel is connected to the primary toothed wheel, a secondary toothed wheel is provided and meshes with the primary toothed wheel and the number of teeth of the primary toothed wheel is greater than the number of teeth of the secondary toothed wheel.

9. The step down gear train in accordance with claim 1, wherein a longitudinal guide means is provided and substantially extends in a direction that is parallel to a line joining the axis of rotation of the pusher wheel and the axis of rotation of the first cogwheel.

10. The step down gear train in accordance with claim 1, wherein the first cogwheel is directly connected to the pinion.

* * * * *